April 28, 1931.  J. A. STENSRUD  1,803,216
HORSE COLLAR
Filed June 23, 1930   2 Sheets-Sheet 1
Fig. 1.
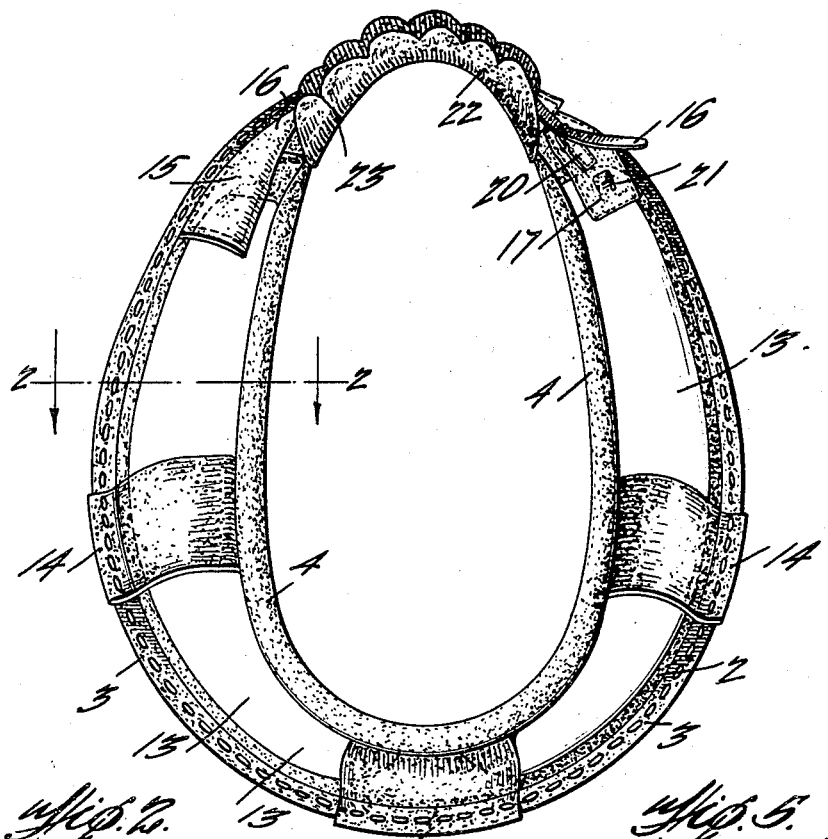
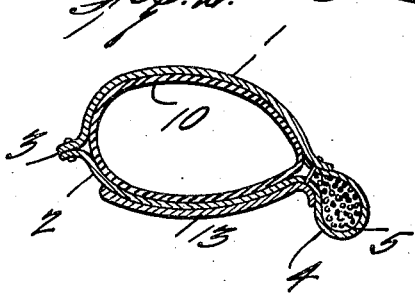
Fig. 2.
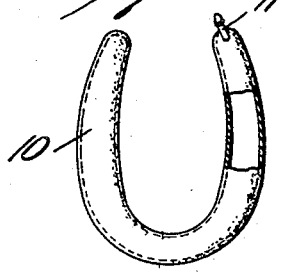
Fig. 3.
JOHN A. STENSRUD
INVENTOR
BY Victor J. Evans
ATTORNEY April 28, 1931. J. A. STENSRUD 1,803,216
HORSE COLLAR
Filed June 23, 1930 2 Sheets-Sheet 2
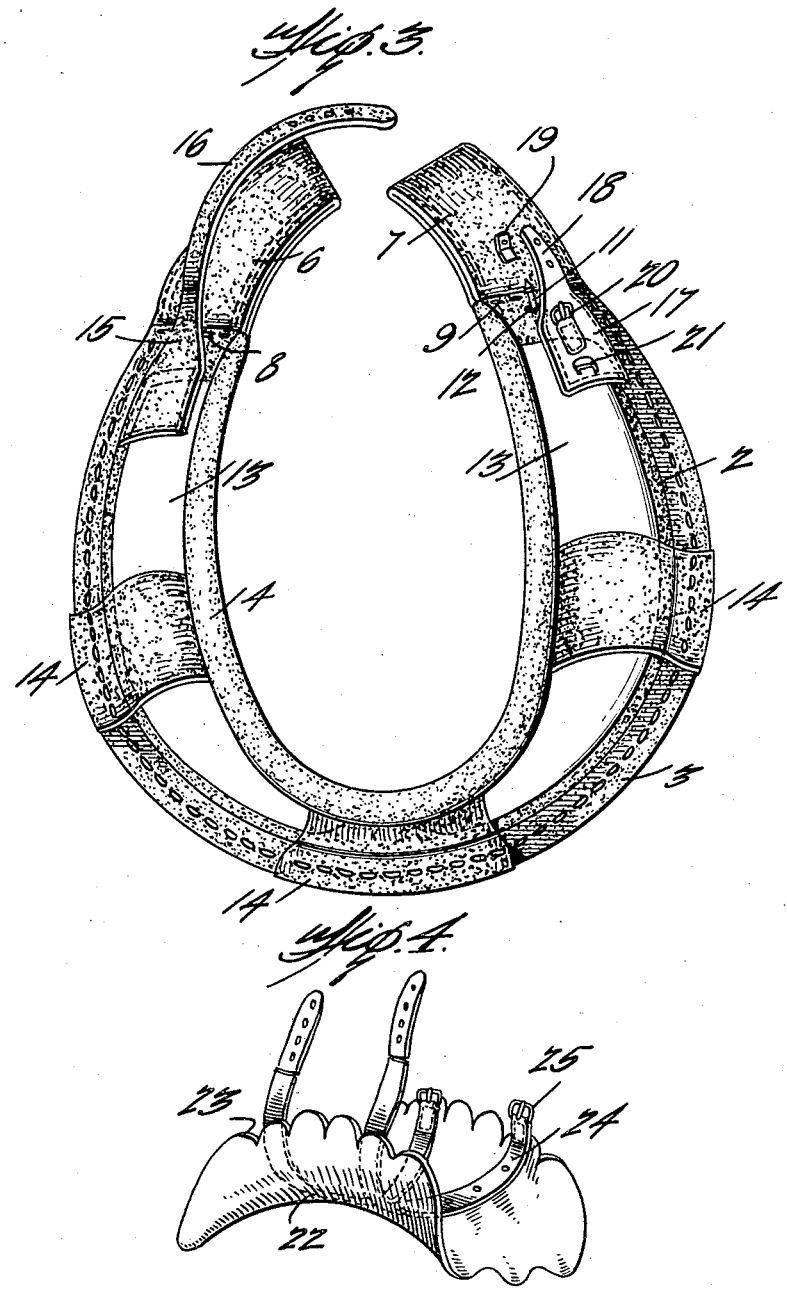
JOHN A. STENSRUD
INVENTOR
BY Victor J. Evans
ATTORNEY Patented Apr. 28, 1931

1,803,216

UNITED STATES PATENT OFFICE

JOHN A. STENSRUD, OF ORISKA, NORTH DAKOTA

HORSE COLLAR

Application filed June 23, 1930. Serial No. 463,247.

My present invention has reference to an open top horse collar and the primary object of the invention is the provision of a pneumatic horse collar that shall be adjustable so that the same collar may be used on different size horses, and further wherein the inner face of the collar is rendered yieldable through the medium of the pneumatic tube therein, so that the pressure against the horse will be equal throughout and whereby the collar will adapt itself to the portion of the shoulder of the horse contacted thereby and exert no friction against the parts thus contacted, thus obviating friction or wear and obviating the injury to the animal thus occasioned, and consequently to produce a humane horse collar.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a face view of a horse collar in accordance with this invention.

Figure 2 is a sectional view on the line 2—2 of Figure 1.

Figure 3 is a view similar to Figure 1 but showing the collar open and the neck pad removed.

Figure 4 is a perspective view of the neck pad.

Figure 5 is a plan view of the pneumatic tube with parts in section.

The collar is constructed of leather and is, of course, of the ordinary shape. For distinction the inner face of the collar is indicated by the numeral 1 and the outer face thereof by the numeral 2. The leather strips that provide the faces 1 and 2 have their outer edges thong sewed, as at 3, to provide the outer edge. The leather faces 1 and 2 at the inner face of the collar are each rounded upon themselves and stitched together to provide the roll 4 and this roll is stuffed with long straw, as indicated by the numeral 5.

Beyond the edge 3 and the roll 4 the inner face 1 of the collar is formed with extensions which are preferably folded against each other and stitched together and which provide what I will term flaps 6 and 7, respectively. The flaps when the collar is arranged on the horse are designed to be disposed in lapping relation. The outer face 2 of the collar is, of course, at the juncture of the edge 3 and the roll 4 with the flaps 6 and 7, connected to the inner faces by leather lacings 8 and 9, respectively and these lacings are removable.

The faces 1 and 2, below the connected portions 8 and 9 thereof afford therebetween a pocket and inserted in this pocket there is a pneumatic tube 10 which, of course, conforms itself to the shape of the collar. One end of the tube is closed, but the second end thereof, is provided with an inwardly opening valve whose casing is indicated by the numeral 11 and this casing projects through a suitable opening 12 in the face of the collar adjacent to the removable thongs 9. The tube 10 may be air inflated to a desired degree.

Preferably there is arranged over the outer face of the collar, at the sides thereof steel or like metal plates 13, the same being held between the edge 3 and roll 4 by spaced leather strips 14, respectively, the strips, of course, being stitched to the edge 3 and to the inner face of the roll 4, and the inner edges of the plates 13 are rounded to conform to the side walls of the roll 4.

Secured to the outer face 2, adjacent to the flap 6 by suitable stitches there is a leather member 15 which terminates in a strap extension 16. Likewise stitched to the outer face of the collar, in the second side thereof and below the valve stem 11 there is stitched a second leather member 17 which also merges into a strap extension 18. This strap extension is designed to engage with a loop or buckle 19 and thereby cover the valve stem. The leather member 17 has fixed therein a buckle 20 and a loop 21. The tongue of the buckle is designed to be received through any of the spaced openings in the strap 16 and whereby the collar is adjustable to various sizes of horses.

In arranging the collar upon the horse I place between the lapping flaps 6 and 7 a longitudinally arched and cross-sectionally U-shaped neck pad 22. This pad has both its ends and its edges scalloped, as at 23, and on the outer face of the neck pad there are fixed straps 24 each of which has one of its ends provided with a buckle 25 whose tongue is designed to be received through openings in the outer and longer end of the said strap 24.

With my improvement it will be noted that the pneumatic tube 10 has its valve stem 11 fully protected by the strap 18. It will also be noted that the steel or like metal bars 13 prevent the bulging of the outer face of the collar when the tube 10 is inflated. The tube 10 is inflated by an ordinary automobile tire pump and the said tube, of course, may be inflated to any desired degree. The neck pad 22 is yieldable laterally and the collar is adjustable through the medium of the strap 16 which engages with the buckle 20.

With my improvement there will be no bunching of the collar against the shoulder of the horse, sweat pads will be dispensed with and the collar will be found cool in warm weather. The collar takes the shock and jar from the horse and equalizes the draft on both sides of the horse. The collar will adjust itself to the shapes of different size horses on which it is arranged and can be readily changed from one horse to another and, as stated, adjusted to fit the horse. My collar produces no frictional contact with the shoulder of the animal. The pneumatic tube 10 can be removed from this pocket by merely unlacing the thongs 8 or 9 so that the tube can be changed if necessary. The collar is light in weight, is humane to the horse and easier upon the horse should he have shoulder sores. The neck pad will retain the collar in its proper shape when arranged upon the animal and it is thought the foregoing description will fully and clearly set forth the construction and advantages to those skilled in the art so that further description will not be required.

Having described the invention, I claim:

1. An open-top horse collar having inner and outer faces, the ends of the inner face extending beyond the outer face to provide flaps, removable means for securing the edge of the outer face to the inner face at the juncture of the flaps with said inner face, a pneumatic tube received between the faces of the collar, having one end closed and its other end provided with an inwardly opening valve stem which extends through one face of the collar, a protective strap for the stem, a strap on one of the outer faces of the collar, and a buckle on the second outer face of the collar to adjustably connect the strap thereto and to arrange the flaps in lapping relation.

2. An open-top horse collar having inner and outer faces, the ends of the inner face extending beyond the outer face to provide flaps, removable means for securing the edge of the outer face to the inner face at the juncture of the flaps with said inner face, a pneumatic tube received between the faces of the collar, having one end closed and its other end provided with an inwardly opening valve stem which extends through one face of the collar, a protective strap for the stem, a strap on one of the outer faces of the collar and a buckle on the second outer face of the collar to adjustably connect the the strap thereto and to arrange the flaps in lapping relation, and metal plates secured upon the outer face at the sides of the collar.

3. An open-top horse collar having inner and outer faces, the ends of the inner face extending beyond the outer face to provide flaps, removable means for securing the edge of the outer face to the inner face at the juncture of the flaps with said inner face, a pneumatic tube received between the faces of the collar, having one end closed and its other end provided with an inwardly opening valve stem which extends through one face of the collar, a protective strap for the stem, a strap on one of the outer faces of the collar and a buckle on the second outer face of the collar to adjustably connect the strap thereto and to arrange the flaps in lapping relation, metal plates secured upon the outer face at the sides of the collar, and leather members secured to the collar and overlying the plates for sustaining the same in position.

In testimony whereof I affix my signature.

JOHN A. STENSRUD.